(12) United States Patent
Venkatachary

(10) Patent No.: US 7,613,755 B1
(45) Date of Patent: Nov. 3, 2009

(54) SIGNATURE SEARCHING SYSTEM

(75) Inventor: Srinivasan Venkatachary, Sunnyvale, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 775 days.

(21) Appl. No.: 11/397,308

(22) Filed: Apr. 3, 2006

Related U.S. Application Data

(60) Provisional application No. 60/667,877, filed on Apr. 1, 2005.

(51) Int. Cl.
*G06F 15/00* (2006.01)
(52) U.S. Cl. ..................................................... 708/212
(58) Field of Classification Search .................. 708/212
See application file for complete search history.

(56) References Cited

U.S. PATENT DOCUMENTS

| | | | | | |
|---|---|---|---|---|---|
| 4,959,811 | A | * | 9/1990 | Szczepanek | 365/49.17 |
| 5,761,521 | A | * | 6/1998 | Chilinski et al. | 712/1 |
| 7,116,663 | B2 | * | 10/2006 | Liao | 370/392 |
| 7,440,304 | B1 | * | 10/2008 | Raj | 365/49.1 |
| 2003/0058671 | A1 | * | 3/2003 | Lindahl et al. | 365/49 |

* cited by examiner

*Primary Examiner*—Tan V Mai
(74) *Attorney, Agent, or Firm*—Mahamedi Paradice Kreisman LLP; William L. Paradice, III

(57) ABSTRACT

In a signature searching system, contents of a ternary content addressable memory (CAM) are searched to obtain a first index value that corresponds to a first group of predetermined data sequences. The first group of predetermined data sequences is selected from among a plurality of groups of predetermined data sequences based, at least in part, on the first index value, and a determination made as to whether any of the predetermined data sequences within the first group is present within a stream of data.

20 Claims, 3 Drawing Sheets

SIGNATURE SEARCHING SYSTEM

CROSS-REFERENCE TO RELATED APPLICATIONS

This application claims priority from, and hereby incorporates by reference, U.S. Provisional Application No. 60/667,877, filed Apr. 1, 2005 and entitled "Signature Searching Using Network Search Engines (NSEs)."

TECHNICAL FIELD

The present invention relates generally to the field of data processing, and more particularly to signature searching methods and apparatus.

BACKGROUND

A network system attack (also referred to herein as an intrusion) is usually defined as an unauthorized or malicious use of a computer or computer network. In some cases, a network system attack may involve hundreds to thousands of unprotected network nodes in a coordinated attack, which is levied against specific or random targets. These attacks may include break-in attempts, including but not limited to, email viruses, corporate espionage, general destruction of data, and the hijacking of computers/servers to spread additional attacks. Even when a system cannot be directly broken into, denial of service attacks can be just as harmful to individuals and companies, who stake their reputations on providing reliable services over the Internet. Because of the population's increasing usage and reliance on network services, individuals and companies have become increasingly aware of the need to combat system attacks at every level of the network, from end hosts and network taps to edge and core routers.

Intrusion Detection Systems (or IDSs) are emerging as one of the most promising ways of providing protection to systems on a network. Intrusion detection systems automatically monitor network traffic in real-time, and can be used to alert network administrators to suspicious activity, keep logs to aid in forensics, and assist in the detection of new viruses and denial of service attacks. They can be found in end-user systems to monitor and protect against attacks from incoming traffic, or in network-tap devices that are inserted into key points of the network for diagnostic purposes. Intrusion detection systems may also be used in edge and core routers to protect the network infrastructure from distributed attacks.

Intrusion detection systems increase protection by identifying attacks with valid packet headers that pass through firewalls. Intrusion detection systems provide this capability by searching both packet headers and payloads (i.e., content) for known attack data sequences, referred to as "signatures," and following prescribed actions in response to detecting a given signature. In general, the signatures and corresponding response actions supported by an intrusion detection system are referred to as a "rule-set database," "IDS database" or simply "database." Each rule in the database typically includes a specific set of information, such as the type of packet to search, a string of content to match (i.e., a signature), a location from which to start the search, and an associated action to take if all conditions of the rule are matched. Different databases may include different sets of information, and therefore, may be tailored to particular network systems or types of attack.

As intrusion detection generally requires incoming data streams to be searched in real time, the ever-increasing throughput of network devices and the rapid growth of rule databases has begun to strain the capacity of existing intrusion detection systems, putting pressure on designers to find new ways to meet application demands. One technique for improving intrusion detection efficiency is to restrict signature searching to a limited portion of the signature database based on packet header fields. In a typical approach, the network processor compares a packet header field with a set of signature group assignments to identify a subset of groups that are to be searched for the specific header value. Unfortunately, this approach to restricted signature searching does not scale well as signature databases expand. For example, even the subsets of groups that are to be searched for a specific header are growing rapidly, leading to many of the same capacity issues faced by existing intrusion detection systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single-conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. The term "exemplary" is used to express an example, not a preference or requirement.

In various signature searching embodiments disclosed herein, "tuples" formed by combinations of packet headers are used to more efficiently prune signature databases and thus yield smaller more targeted sets of signature groups and corresponding packet regions to be searched. Unfortunately, searching by tuples using existing methods would generally require multiple searches to identify respective sets of signature groups, followed by significant post-processing to identify the signature groups that are common to each set. Also, while a database of the possible combinations packet field combinations could be generated and used as a lookup table, the resulting table would likely expand quickly to unmanageable proportions as N packet header fields each having up to X values per packet header (i.e., $N^X$ entries) are stored.

In one embodiment, efficient tuple storage and searching is achieved using a ternary content addressable memory (TCAM) that is modified or operated in a modified manner to efficiently determine match indices for all matches to a given search value. Using this tuple-based approach, a signature searching system may be implemented by performing a preliminary TCAM search based on one or more selected combinations of packet headers to generate a value that may be used to index a signature group database or table. The indexed entry may then be read out of the signature group database and forwarded to a network search engine along the corresponding packet or portions thereof specified within the signature-group database entry. The network search engine may then execute a string matching search to determine whether the limited signature groups specified by the signature-group data base entry are found within the supplied packet portions and if so, notify a host processor of the signature detection so that routing, classification and/or remedial actions may be carried out accordingly.

Figure 1:
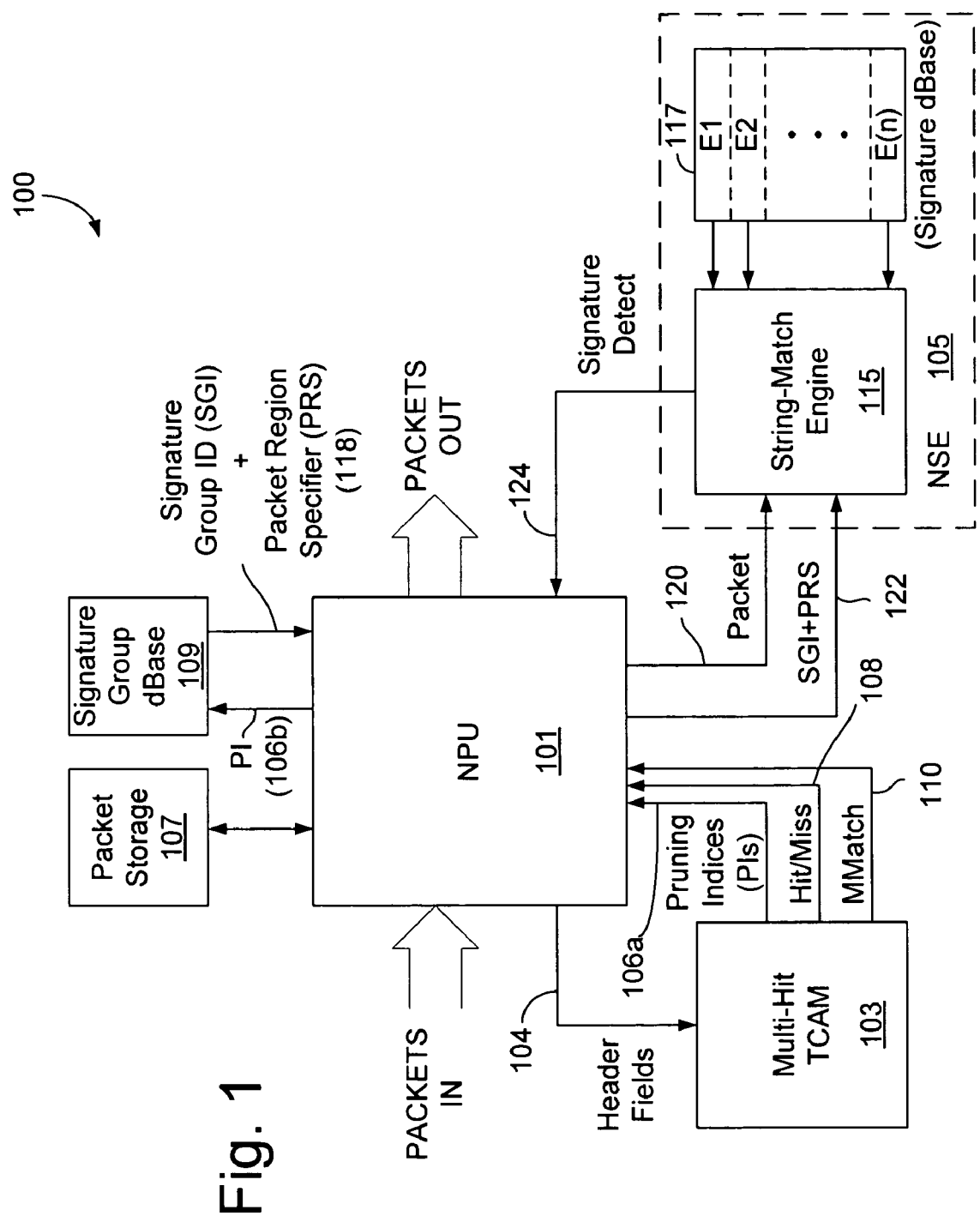
FIG. 1 illustrates an embodiment of signature searching engine that may be included within an intrusion detection system.

FIG. 1 illustrates an embodiment of signature searching engine 100 that may be included within an intrusion detection system. For purposes of description, the intrusion detection system is assumed to be included in a network switching device such as a switch or router, but may alternatively be provided within a network appliance, dedicated intrusion detection device or, more generally, any system or device in which signature-based intrusion detection may be applied. As shown, the signature searching engine 100 includes a network processing unit 101 (NPU, which may be a special-purpose or general-purpose processor), multi-hit TCAM 103, and network search engine 105 (NSE). Packets received at ingress ports of a switching device are provided to the NPU 101 which stores the packet in a packet storage device 107 (e.g., a static random access memory (static RAM or SRAM) or dynamic RAM (DRAM) which may be integrated onto the same integrated circuit die or within the same integrated circuit package as the NPU 101 or may be a discrete integrated circuit device), and forwards selected header fields 104 to the multi-hit TCAM 103 in the form of a search key or comparand (i.e., a search value). In one embodiment, the TCAM 103 has stored in a CAM array therein a database of tuples that correspond to respective groups of signatures, with each tuple including some number of fields that correspond to the packet header fields 104 included within the search key. Further, within each tuple, selected bits within each field may be recorded in a "don't care" or masked state to support wild-card comparison with the packet header fields of the incoming search key, thereby enabling a relatively large range of tuple values to be represented by a single TCAM entry.

To support efficient multi-hit capability within the TCAM 103, an additional N-bit bypass field, with N=$\log_2$ (number of tuples in database), is appended or pre-pended to each tuple to enable tuple groups to be selectively bypassed in an iterative set of searches using the same search key. For example, if there are 1024 tuples in a given tuple database, a ten-bit bypass field is allocated and loaded with respective values 0-1023 for each tuple entry (i.e., bypass field for tuple entry 0=0, bypass field for tuple entry 1=1 and so forth). By this arrangement, if a hit occurs within tuple entry 255 of the TCAM, and the TCAM indicates that multiple matches have occurred, then one or more subsequent searches are applied with a bypass field of the search value and a global mask value set to enable hits only in tuple entries having lower priority than the location that yielded the last hit (e.g., a first search with all bypass field bits masked out, except bit 8 which is set to '1' in the search key, followed by a second search with all bypass field bits masked out except bit 9 which is set to '1' in the search key). Through this operation, searches may be performed iteratively for a given search key without having to modify the tuple database to invalidate match-yielding entries after each match (i.e., as might otherwise be the case in order to uncover lower priority matches), and therefore provides an efficient approach to generating pruning indices for all tuples that match a given search key. In particular, because the tuple database need not be modified after each match (i.e., no entry invalidation required), pipelined searches of the tuple database may be carried out by interleaving a sequence of searches for one packet (i.e., the header fields thereof) with sequences of searches for one or more other packets. With regard to shifting of bits within the global mask value in the sequence of searches carried out for a given packet, the NPU 101 may supply the bit shifted global mask value (and thus shift the bits as necessary according to the pruning index and multiple match status returned for each search), or the multi-hit TCAM 103 may include hardware for revising the global mask value based upon the match index (i.e., pruning index and multiple match status). In the latter embodiment, the TCAM 103 may also internally generate the bypass field that is appended or pre-pended to the search key to carry out the tuple search. Various embodiments of TCAMs that may be used to implement the multi-hit TCAM 103 are disclosed in U.S. patent application Ser. No. 10/866,353, filed Jun. 11, 2004 and entitled "Circuit, Apparatus, and Method for Extracting Multiple Matching Entries From a Content Addressable Memory (CAM) Device," and which is hereby incorporated by reference.

Still referring to FIG. 1, the multi-hit TCAM 103 returns the pruning index 106a (PI) generated in response to a given search to the NPU 101 along with a hit/miss signal 108 (Hit/Miss) that indicates whether the pruning index 106a resulted from a match detection (and thus whether the pruning index is valid) and also a multiple-match signal 110 (MMatch) to indicate whether one or more other entries within the tuple database matched the search key and thus that one or more iterations of the same search with updated bypass fields may need to be performed. The NPU, in response, uses the pruning index or a version thereof 106b to index a signature group database 109 stored within an internal or dedicated storage (e.g., SRAM or DRAM) and thus obtain a signature group identifier (SGI) and corresponding packet region specifiers (PRS), shown collectively at 118. The signature group identifier specifies one or more signature groups within a signature database 117 maintained within the network search engine 105, and the packet region specifier indicates one or more regions within the corresponding packet that are to be searched (e.g., specifying a starting offset into the packet to a first search region, a length of the first search region, a distance from the end of the first search region to a second search region, a length of the second region and so forth). In addition to the signature database 117, the network search engine 105 includes a string-match engine 115 that executes a string search using any number of string matching techniques (e.g., Boyer-Moore, Knuth-Morris-Pratt, Aho-Corasick, or derivatives thereof) to determine whether any of the signatures within the signature groups specified by the signature group identifier (i.e., selected signature groups within database 117) are found within the regions of the packet 120 specified by the packet region specifier. The NPUT 101 may provide the packet 120 in whole to the string-match engine, selected portions thereof, or a pointer to the packet that may be used by the string-match engine 115 to retrieve portions of the packet as needed. Various embodiments of network search engines and/or string-matching engines that may be used to implement the network search engine 105 or components thereof are disclosed in U.S. patent application Ser. No. 11/388,785, filed Mar. 24, 2006 and entitled "Memory Optimized Pattern Searching" and in U.S. Provisional Patent Application No.

60/665,478, filed Mar. 24, 2005 and entitled "Memory Optimized Pattern Searching (MOPS)," both of which are hereby incorporated by reference.

If a signature is detected, the string-match engine 105 notifies the NPU 101 of the signature detection (124), and may provide information regarding the signature detection as necessary to enable the NPU 101 to take remedial action (e.g., the NSE 105 may provide the packet header or some portion thereof to identify the suspect packet, the offset within the packet at which the signature was found, the signature itself or a corresponding ID, and/or a value or rule that indicates the remedial action to be taken, etc.). Thus, the signature detection result 124 provided by the NSE may include not only the matching signatures and their locations within the packet, but could also may include all or part of the original search request, the search request itself including, for example and without limitation, all or part of the searched packet, and a transaction identifier that uniquely identifies the search request.

Depending on the packet type and signature detected, the NPU 101 may halt further searching (e.g., upon determining that the packet is not to be forwarded) or may continue signature searching to completion or at least until another signature is detected. In either case, the NPU 101 may forward packets (i.e., as shown by "Packets Out") for which no signatures are detected and selectively forward packets (i.e., forward or not forward according to the nature of the packet and/or signature) and/or send other notifications in which signatures are detected.

Figure 2:
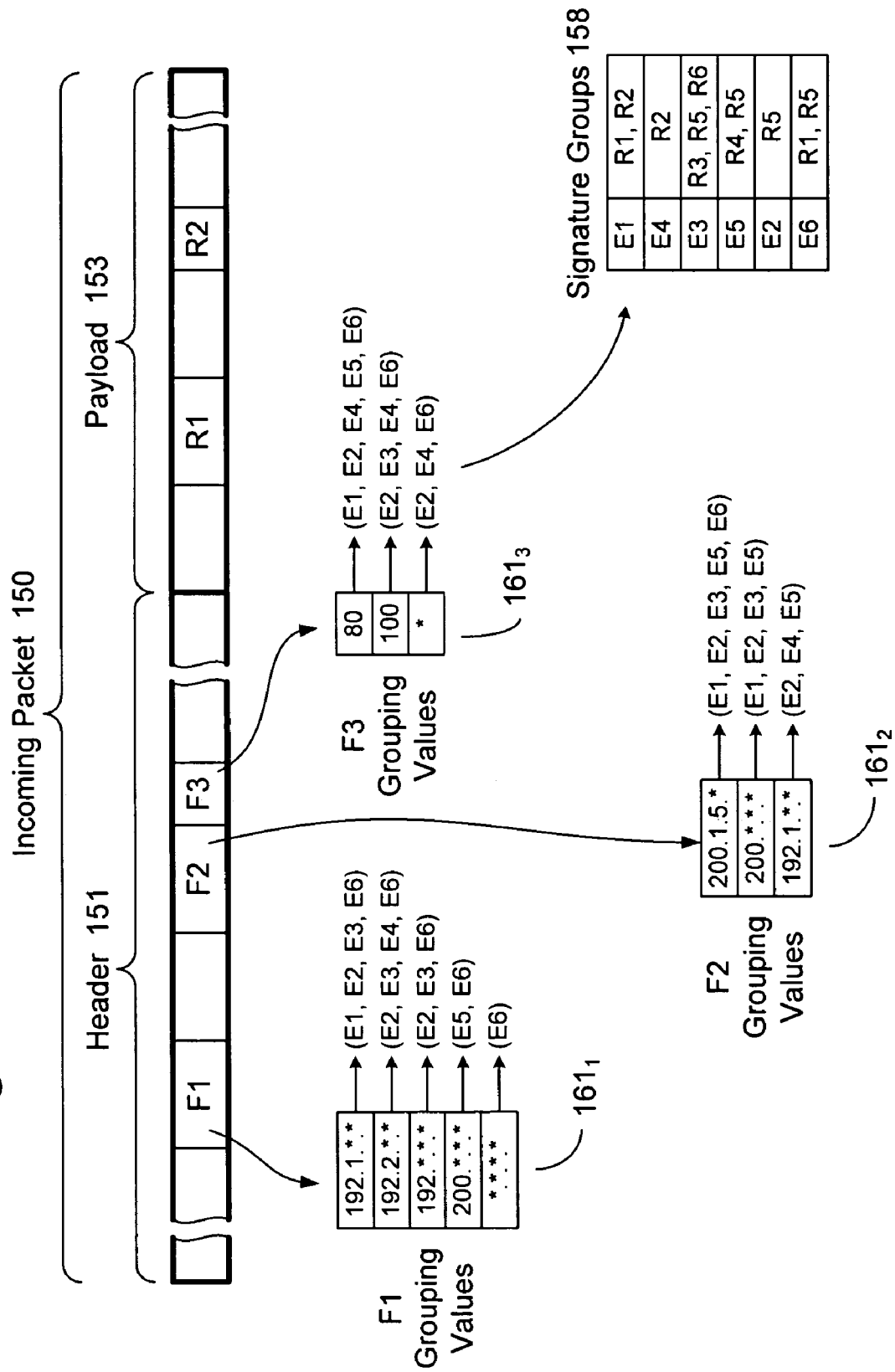
FIG. 2 illustrates an exemplary packet that may be searched by the signature searching engine of FIG. 1.

FIG. 2 illustrates an exemplary packet 150 that may be searched by the signature searching engine 100 of FIG. 1. As shown, the packet 150 includes a header portion 151 having a number of fields, F1, F2 and F3, that may be correlated to signature groups, as well as a payload portion 153 having number of packet regions, R1, R2, . . . , R6 (only R1 and R2 being shown), that are to be searched in association with different search groups. An exemplary set of signature groups, designated E1-E6, and associated packet region specifications) is shown at 158. Thus, if the packet header fields F1-F3 indicate that a signature search is to be carried out for signature group E1, then a string matching operation for each signature in signature group E1 is carried out by searching within payload regions R1 and R2 for the specified signatures.

As shown, each of the packet header fields F1-F3 may be associated with respective sets of grouping values $161_1$, $161_2$, $161_3$ that, if present in the corresponding header field, indicate that a particular set of signature groups are to be searched. For example, if header field F1 (e.g., a 32-bit field expressed by the notation v1.v2.v3.v4, where v1 through v4 are respective 8-bit component fields that may range from 0-255 in each incoming packet) matches grouping value 192.1.*.* ('*' denoting a "don't care" 8-bit component field within the grouping value), then signature groups E1, E2, E3 and E6 are to be searched (i.e., absent further signature group pruning). Similarly, if F1 matches 192.2.*.*, then a different set of signature groups E2, E3, E4, E6 are to be searched and, for any value of F1, signature group E6 is to be searched (i.e., *.*.*.* corresponds to signature group E6). Continuing the example, it can be seen that three grouping values apply in the case of F2 (also a 32-bit field), each grouping value corresponding to a different set of signature groups, and that three groping values also apply in the case of F3 (a 16-bit field). Note that the number of header fields used for signature grouping and the size of each field may vary from application to application. In the particular example shown, the F1, F2 and F3 fields may be, for example, source address, destination address and port number fields within incoming IPv4 (Internet Protocol version 4) packets. Different fields, numbers of fields and field sizes may apply for different packet types and different intrusion detection schemes.

Figure 3:
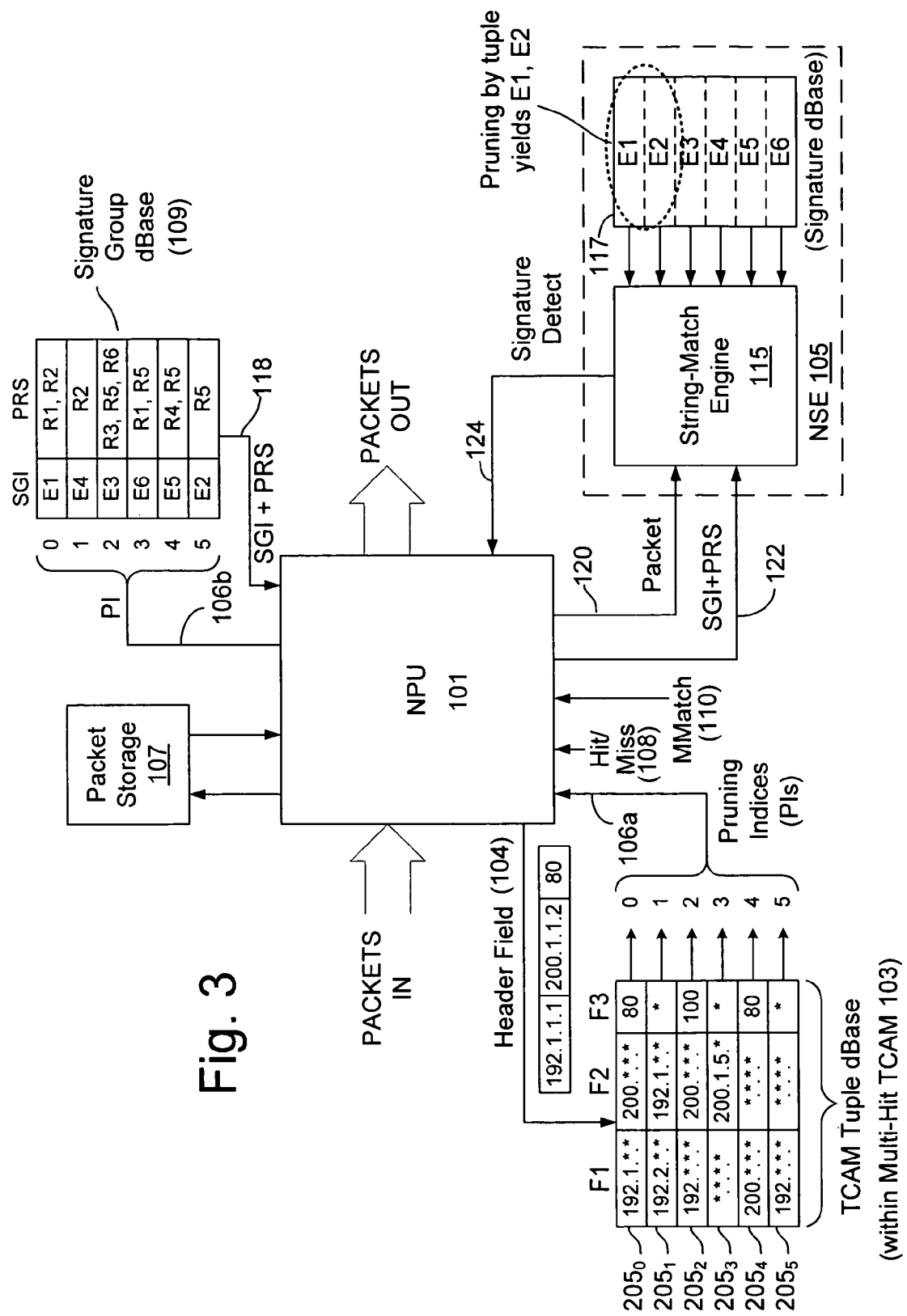
FIG. 3 illustrates application of the signature searching engine of FIG. 1 to the exemplary signature grouping sets shown in FIG. 2.

FIG. 3 illustrates application of the signature searching engine of FIG. 1 to the exemplary signature grouping sets $161_1$-$161_3$ shown in FIG. 2. In particular, a tuple database is loaded into the TCAM 103, with each tuple entry $205_0$-$205_5$ corresponding to one or more of the signature groups shown in FIG. 2. For example, a first tuple entry $205_0$ in the TCAM, [192.1.*.*][200.*.*.*][80], corresponds to signature group E1 (i.e., because E1 is the only signature group common to grouping value within the tuple), a second tuple entry $205_1$ in the TCAM, [192.2.*.*][192.1.*.*][*], corresponds to signature group E4, and so forth. When an incoming header field, obtained from an incoming packet and shown in this example to be [192.1.1.1][200.1.1.2][80], is compared with the contents of the TCAM, the highest priority match (assuming descending priority progressing from the top of the tuple database to the bottom) occurs in tuple entry $205_0$, so that the TCAM 103 (or priority encoding logic therein) generates a pruning index 106a (i.e., match address) having value 0. The NPU indexes the signature group database 109 using the pruning index or version thereof (106b) and thus retrieves a signature group index (SGI) that corresponds to signature group E1 and a corresponding packet region specifier (PSR) (SGI and PSR shown collectively as 118), indicating that regions R1 and R2 of the packet, buffered in packet storage 107, are to be searched. The NPU 101 then provides the signature group index and packet region specifier to the network search engine (i.e., as shown at 122) along with the corresponding packet 120 (or portion thereof or pointer thereto), thereby enabling the string-match engine 115 to search the specified regions of the packet 120 for data sequences that match the signatures within signature group E1. Concurrently with indexing the signature group data base 109 and initiating signature searching within the NSE 105, the NPU 101 may respond to assertion of the multiple-match signal 110 (MMatch) by repeating the search for the same header field combination, but this time using the bypass approach described above to suppress match detection within the prior-matching tuple entry and any tuple entries having higher priority than the prior-matching tuple entry. In this particular example, the repeated search results in a match at tuple entry $205_5$, but no other matches so that the hit/miss signal 108 is asserted, but the multiple match signal 110 is deasserted. Accordingly, the NPU 101 applies the corresponding pruning index (PI=5) returned by the TCAM 103 in a lookup within the signature group database 109 to obtain a signature group index that corresponds to signature group E2 and a search region specifier that indicates that region R5 of the corresponding packet to be searched. Accordingly, the NPU 101 forwards the signature group index and the packet region specifier to the network search engine 105 which, in turn, carries out a string matching operation to determine if any of the signatures within signature group E2 are located within region R5 of the packet and, if so, notifies the NPU 101 via signature detect 124 so that packet forwarding or other routing, classification or remedial actions may be taken in view of the signature detection. Thus, overall, the incoming packet bearing field values [192.1.1.1][200.1.1.2][80] is evaluated in regions R1 and R2 for the limited set of signatures in signature group E1, and in region R5 for the limited set of signatures in signature group E2. By contrast, if a single packet header field had been applied to determine the signature groups, four or five signature groups would have been searched (e.g., groups E1, E2, E3 and E6 if F1 applied, groups E1, E2, E3 and E5 if F2 applied, and groups E1, E2, E4, E5 and E6 if F3 applied). Further, the parallelism achieved by the TCAM tuple search operation, enables pruning indices to be generated rapidly, in a single search operation, and the multi-hit capability of the TCAM 103 (and/or provided by a method of operating the TCAM 103) enables header fields from multiple packets to be searched in a pipelined manner.

In embodiments of the invention, many of the above-described techniques may be carried out, at least in part, by computer system having a processing entity and a system memory. The processing entity may include one or more processors (e.g., general-purpose processors and/or special-purposes processors such as a network processor), and the system memory may include any number of component memories including, without limitation, volatile and/or non-volatile memories. The processing entity (e.g., one or more processors) executes one or more sequences of one or more instructions stored in the system memory to perform the operations described above. In alternative embodiments, hard-wired circuitry may be used in place of or in combination with the programmed processing entity to implement the invention. Thus, embodiments of the invention are not limited to any specific combination of hardware circuitry and software.

The instructions executed by the processing entity to perform the operations described above may be transferred to the system memory from a computer-readable medium. A computer-readable medium may take many forms, including but not limited to, non-volatile media, volatile media, and transmission media. Non-volatile media may include, for example, optical or magnetic media (e.g., disks) and/or non-volatile semiconductor memory (e.g., flash memory or battery-backed memory). Transmission media may include, for example and without limitation, coaxial cables, copper wire and fiber optics. Transmission media may also take the form of electromagnetic or acoustic waves, such as those generated during radio-frequency, infra-red or other wireless communications.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of searching a stream of data using a ternary content addressable memory (CAM) to determine whether a predetermined data sequence is present in the data stream:
   searching the contents of the ternary CAM-to obtain a first index value that corresponds to a first group of predetermined data sequences;
   selecting the first group of predetermined data sequences from among a plurality of groups of predetermined data sequences based, at least in part, on the first index value; and
   determining whether any of the predetermined data sequences within the first group is present within the stream of data.

2. The method of claim 1 wherein the stream of data comprises a packet and wherein searching the contents of the ternary CAM comprises:
   combining data from a plurality of fields within a header of the packet to generate a search value; and
   comparing the search value with the contents of the ternary CAM.

3. The method of claim 1 wherein selecting the first group of predetermined data sequences from among the plurality of groups of predetermined data sequences comprises indexing a lookup table using the first index value to obtain an identifier of the first group of predetermined data sequences.

4. The method of claim 3 further comprising addressing a data storage having the plurality of groups of predetermined data sequences stored therein based on an address determined, at least in part, from the identifier of the first group of predetermined data sequences.

5. The method of claim 3 further comprising indexing the lookup table using the first index value to obtain a value that indicates one or more regions to be searched within the stream of data.

6. The method of claim 1 wherein searching the contents of the ternary CAM to obtain a first index value comprises comparing a first search value obtained from a combination of packet header fields with the contents of the ternary CAM.

7. The method of claim 6 further comprising comparing the first search value with the contents of the ternary CAM to obtain a second index value that corresponds to a second group of predetermined data sequences.

8. The method of claim 7 wherein comparing the first search value with the contents of the ternary CAM to obtain a second index value that corresponds to a second group of predetermined data sequences comprises comparing the first search value with the contents of the ternary CAM to obtain the second index value concurrently with said determining whether any of the predetermined data sequences within the first group is present within the stream of data.

9. The method of claim 1 wherein determining whether any of the predetermined data sequences within the first group is present within the stream of data comprises performing a string-matching operation to determine whether a character string within the first group is present within the stream of data.

10. A signature searching apparatus comprising:
- a processing unit to generate a search value obtained from a combination of header fields within a packet;
- a ternary content addressable memory (CAM) to receive the search value from the processing unit and to generate a first index value that corresponds to a storage location within the ternary CAM; and
- a string-match engine to determine whether the packet includes any of a plurality of data sequences indicated by the first index value.

11. The signature searching apparatus of claim 10 wherein the processing unit comprises a network processing unit.

12. The signature searching apparatus of claim 10 further comprising a storage device to store a lookup table that correlates the first index value to the plurality of data sequences.

13. The signature searching apparatus of claim 10 wherein the string match engine includes an output coupled to the processing unit to signal the processing unit if the packet includes any of the plurality of data sequences indicated by the first index value.

14. The searching apparatus of claim 10 wherein the processing unit is configured to issue a first search instruction to the ternary CAM to initiate a first comparison of the search value and a first plurality of entries within the ternary CAM, and is further configured to issue a second search instruction to the ternary CAM to initiate a second comparison of the search value a subset of the first plurality of entries within the ternary CAM.

15. The searching apparatus of claim 10 wherein the string-match engine comprises a finite state machine.

16. An apparatus for searching a stream of data to determine whether a predetermined data sequence is present in the data stream:
- means for searching the contents of a tuple database to obtain a first index value that corresponds to a first group of predetermined data sequences;
- means for selecting the first group of predetermined data sequences from among a plurality of groups of predetermined data sequences based, at least in part, on the first index value; and
- means for determining whether any of the predetermined data sequences within the first group is present within the stream of data.

17. The apparatus of claim 16 wherein the stream of data comprises a packet and wherein the means for searching the contents of a tuple database comprises:
- means for combining data from a plurality of fields within a header of the packet to generate a search value; and
- means for comparing the search value with the contents of the ternary CAM.

18. The apparatus of claim 16 wherein the means for selecting the first group of predetermined data sequences from among a plurality of groups of predetermined data sequences comprises means for indexing a lookup table using the first index value to obtain an identifier of the first group of predetermined data sequences.

19. The apparatus of claim 18 further comprising means for addressing a data storage having the plurality of groups of predetermined data sequences stored therein based on an address determined, at least in part, from the identifier of the first group of predetermined data sequences.

20. The apparatus of claim 16 wherein the means for determining whether any of the predetermined data sequences within the first group is present within the stream of data comprises means for performing a string-matching operation to determine whether a character string within the first group is present within the stream of data.

* * * * *

UNITED STATES PATENT AND TRADEMARK OFFICE
CERTIFICATE OF CORRECTION

PATENT NO.       : 7,613,755 B1                                                Page 1 of 1
APPLICATION NO. : 11/397308
DATED            : November 3, 2009
INVENTOR(S)      : Srinivasan Venkatachary It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this

Nineteenth Day of October, 2010

David J. Kappos
*Director of the United States Patent and Trademark Office*